United States Patent Office 3,238,240
Patented Mar. 1, 1966

3,238,240
PERHALOALKYL CHLOROSULFATES AND FLUOROSULFATES
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed Sept. 20, 1963, Ser. No. 310,441
7 Claims. (Cl. 260—456)

This application is a continuation-in-part of co-pending application Serial No. 735,702, filed May 16, 1958, and now abandoned, for Halogenated Organic Compounds, by Murray Hauptschein and Milton Braid.

This invention relates to perhalogenated chlorosulfates and fluorosulfates of the general formula $RCX_2OSO_2X$ where R is fluorine, a perfluoroalkyl, or a perfluorochloroalkyl radical, and where X may be fluorine, chlorine or both. As used herein the term perfluoroalkyl means an alkyl radical containing only the elements fluorine and carbon and a perfluorochloroalkyl radical means an alkyl radical containing only the elements fluorine, chlorine and carbon.

The hydrocarbon chlorosulfates and fluorosulfates such as methyl chlorosulfate, $CH_3OSO_2Cl$, ethyl chlorosulfate $CH_3CH_2OSO_2Cl$, and the like are well known and may be readily prepared, e.g., by reaction of chlorosulfonic or fluosulfonic acid with a corresponding hydrocarbon alcohol, such as methyl or ethyl alcohol. In the case of perhalogenated compounds however the analogous perhalogenated alcohols are not known. For example, the 1,1-dichloro-1-hydroxy, or 1,1-difluoro-1-hydroxy alcohols are unknown and thus the corresponding chlorosulfate or fluorosulfate cannot be prepared through the usual route of sulfating the hydroxyl group. A few partially halogenated halosulfates have been prepared by reaction of halosulfonic acid with a partially halogenated olefin such as $CF_2=CH_2$ but this reaction cannot be used to prepare perhalogenated halosulfates.

The new perhaloalkyl chlorosulfates and fluorosulfates of the invention are prepared by a new route involving the reaction of chlorosulfonic acid or fluosulfonic acid with a perhalogenated iodide of the formula $RCX_2I$ where R and X are as defined above. In this reaction, the chlorosulfate ($OSO_2Cl$) or fluorosulfate ($OSO_2F$) group replaces the iodine to form the corresponding halosulfate with the halosulfate group ($OSO_2X$) bonded to the carbon vacated by the iodine through an oxygen atom thus:

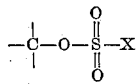

This reaction may be illustrated in the case of 1-iodoperfluoropropane and chlorosulfonic acid by the following equation:

(1) 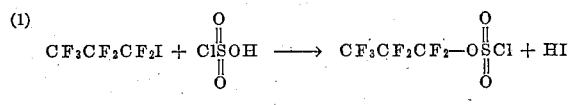

Iodine chlorides and sulfur dioxide are in general the inorganic products ultimately formed, probably as the result of the following reactions:

(2) $ClSO_3H \rightleftarrows SO_3 + HCl$ (3) $SO_3 + 2HI \longrightarrow I_2 + SO_2 + H_2O$ (4) 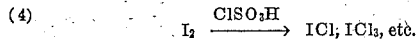

As will be shown in detail in the description which follows, the reaction of fluosulfonic or chlorosulfonic acid with perhalogenated iodides produces the fluorosulfate or chlorosulfate, that is, compounds in which the sulfur of the fluosulfonic or chlorosulfonic acid is linked to a carbon atom through an oxygen atom

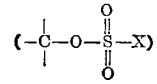

to the substantial exclusion of sulfonyl chlorides or fluorides

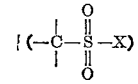

or sulfonic acids

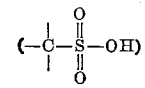

in which the sulfur of the chlorosulfonic group is linked directly to a carbon atom, and to the substantial exclusion also of sulfites

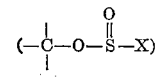

The stable perhaloalkyl chlorosulfates and fluorosulfates provided by the present invention are a valuable class of compounds. Because they are halosulfates, with the sulfur bonded to dihalogenated carbon through an oxygen atom, rather than sulfonic acids in which the sulfur is bonded directly to the dihalogenated carbon, they undergo a series of unique one step reactions (which the corresponding hydrocarbon halosulfates do not undergo) with reagents such as water, ammonia, amines, alcohols and mercaptans to produce respectively perhalogenated carboxylic acids, amides, substituted amides, esters and thiolesters. Reactions of these types, which are described in more detail in our copending applications Serial No. 272,533 filed April 12, 1963, for Preparation of Halogenated Organic Compounds; Serial No. 336,345 filed January 8, 1964, for Preparation of Halogenated Organic Compounds; Serial No. 335,673 filed January 3, 1964, for Preparation of Halogenated Organic Compounds, and Serial No. 336,344 filed January 8, 1964, for Preparation of Halogenated Organic Compounds, may be illustrated in the case of the chlorosulfate $CF_3CF_2CF_2OSO_2Cl$ by the following equations:

(5) $CF_3CF_2CF_2OSO_2Cl + 3HOH \longrightarrow$
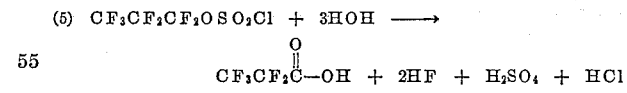

(6) $CF_3CF_2CF_2OSO_2Cl + 3NH_3 \longrightarrow$
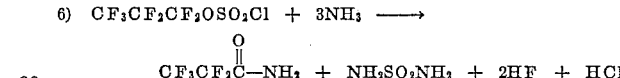

(7) $CF_3CF_2CF_2OSO_2Cl + 3C_2H_5NH_2 \longrightarrow$
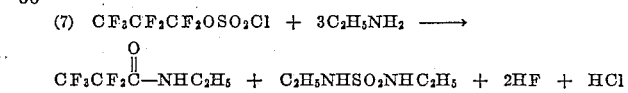

(8) $CF_3CF_2CF_2OSO_2Cl + 3HOC_2H_5 \longrightarrow$
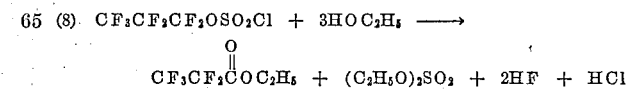

(9) $CF_3CF_2CF_2OSO_2Cl + 3C_2H_5SH \longrightarrow$
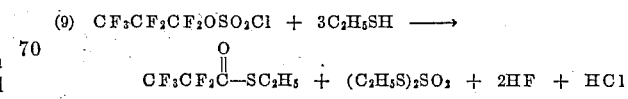

The perhaloalkyl chlorosulfates and fluorosulfates of the invention are thus valuable stable intermediates for the preparation of a large variety of valuable perhalogenated organic compounds many of which are difficult to prepare by other routes.

Of particular value are the perhaloalkylchlorosulfates and fluorosulfates of the invention wherein R is a highly fluorinated alkyl radical such as perfluoroalkyl or a perfluorochloroalkyl radical wherein at least half of the halogens are fluorine.

An especially valuable class of compounds are those in which R is a perfluoroalkyl radical having a relatively long carbon atom chain, particularly those in which R contains from 5 to 15 carbon atoms. The perfluorinated chlorosulfates and fluorosulfates of this type have valuable surface properties due to the extremely low surface energy of the perfluoroalkyl "tail" and the polar hydrophilic nature of the halosulfate group. Similarly, compounds that can be derived from such perfluorinated chlorosulfates or fluorosulfates such as perfluorinated amides, carboxylic acids, esters and thiolesters are likewise highly prized for their unique surface properties. By virtue of such properties such compounds are useful for example as ultra-performance surfactants capable of lowering the surface tension of aqueous or other systems to very low values, or as intermediates for the preparation of resins in which the relatively long perfluoroalkyl "tails" provide a high degree of water and oil repellency when such resins are used to impregnate or coat fabrics, leather, paper or other materials. The chlorosulfates and fluorosulfates of the invention wherein R is a relatively long chain monochloroperfluoroalkyl group (i.e. an alkyl group which is completely fluorinated except for one chlorine) containing from about 5 to 15 carbon atoms, as well as the derivatives that may be prepared from these compounds, likewise display extremely valuable surface properties due to the low surface energy of the monochloroperfluoroalkyl group.

While there is no critical upper limit to the number of carbon atoms contained in the compounds of the invention, they will preferably have from 1 to 100 carbon atoms. Those most useful for conversion to perhalogenated derivatives will contain from 2 to about 30 carbon atoms.

While the precursor perhalogenated iodides used to prepare the halosulfates of the invention may be obtained by any desired procedure, one convenient way to prepare the precursor iodides, particularly those having relatively long carbon chains is by so-called telomerization techniques wherein a short chain perhalogenated alkyl iodide is reacted with a perfluorinated or perfluorochlorinated olefin. Thus, for example telomer iodides of tetrafluoroethylene, chlorotrifluoroethylene, or 1,1-difluoro-2,2-dichloroethylene may be prepared by thermal reaction with a perhalogenated iodide such as $CF_3I$, $C_2F_5I$, $CF_3CFICF_3$, $CF_2ClCFClI$, $CF_2ClCCl_2I$, $CF_3CFICF_2Cl$ or the like. Using these procedures, telomer iodides, for example, of the following types may be produced:

$$R[CF_2CF_2]_nI$$

$$R[CF_2CFCl]_nI$$

$$R[CF_2CCl_2]_nI$$

where R is perfluoroalkyl or a perfluorochloroalkyl radical and where $n$ is an integer from 1 to about 30. Any known telomerization procedure may be used to prepare these or similar telomer iodides. For example, telomer iodides of tetrafluoroethylene or chlorotrifluoroethylene may be prepared, for example by the procedures described by Haszeldine, Journal of the Chemical Society, 3761 (1953), or in United States Patent No. 3,002,030 of Murray Hauptschein and Milton Braid or in co-pending application Serial No. 82,701 filed January 16, 1961, of Murray Hauptschein and Milton Braid, now U.S. Patent No. 3,156,732.

The following are specific examples of typical chlorosulfates and fluorosulfates provided by the invention:

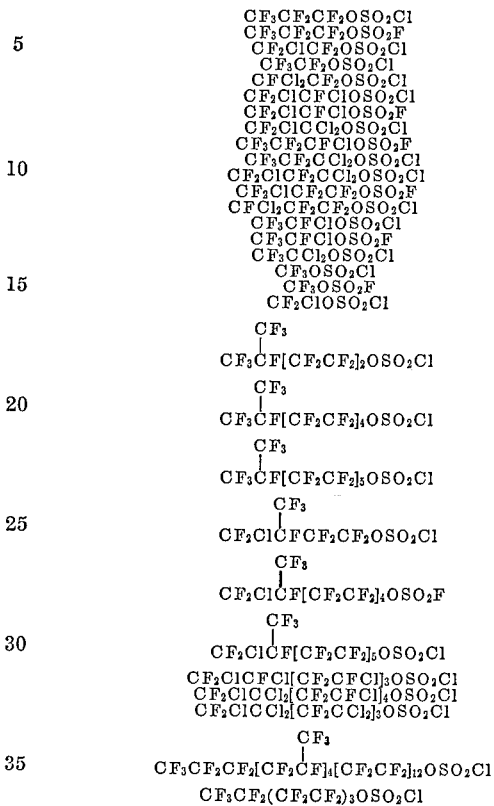

In the preparation of the compounds of the invention by the reaction of corresponding perhalogenated iodides with chlorosulfonic or fluosulfonic acid, the reaction will be carried out at temperatures ranging from about +20° C. to +300° C. and preferably in the range of from about 40° C. to 250° C.

Generally speaking, the rate of reaction increases with increasing temperature. Higher temperatures however, tend to decrease the yield of halosulfate in some cases due to a competing reaction involving the conversion of the iodide to the chloride or fluoride by replacement of iodine with the chlorine or fluorine of the chlorosulfonic or fluosulfonic acid. Thus, the optimum temperature of reaction will often be determined by the optimum balance between the temperatures that give reasonable rates and conversions and those which give the best yield of the desired halosulfate. Generally, the reaction of the iodide with chlorosulfonic acid proceeds more readily at a given temperature than with fluosulfonic acid. Thus, the optimum temperature to form the fluorosulfate may range from 10° C. to 100° C. higher than that found optimum for the chlorosulfate.

The reaction pressure is not critical. Thus, the reaction may be carried out at atmospheric pressure or even under slight vacuum, or if desired under any practical pressures ranging for example, up to 50,000 pounds per square inch. Where the reactants are not volatile compounds the reaction is most conveniently carried out under atmospheric pressure. Where the reactants are low boiling, such, for example, as in the case $CF_3I$, it is desirable to carry out the reaction in an autoclave, or other suitable pressure equipment, so as to maintain the reactants in the liquid phase at the particular reaction temperature involved.

The reaction time is likewise not critical. Reaction periods ranging from several minutes to several days may be used, although in the majority of cases, reaction periods of from 2 to about 15 hours will be found satisfactory.

The molar ratio of the chlorosulfonic or fluosulfonic acid to the iodide is not critical but should generally be in the range of from 1:1 to 20:1 and preferably in the range of about 2:1 to 10:1. Molar ratios of the chlorosulfonic or fluosulfonic acid to iodide of less than 1:1 are wasteful of the starting iodide. An excess of the chlorosulfonic acid is preferable to insure complete reaction of the iodide.

In most cases the halosulfonic acid and the starting iodide can be mixed together and then heated to the reaction temperature.

The reaction may be conducted with or without a solvent. In general no solvent is required, although if desired halogenated solvents may be present.

Since some of the reactants, particularly the halosulfonic acids, and some of the reaction products, are corrosive, it is often preferable to conduct the reaction in glass or glass lined equipment or in metal equipment which is resistant to the corrosive influence of the reagents employed.

Since it is usually preferable to employ an excess of the halosulfonic acid, the reaction product will generally contain unreacted chlorosulfonic or fluosulfonic acid. The halosulfate may be separated from the halosulfonic acid by pouring the reaction mixture over crushed ice or into water held at 0° C. The halosulfonic acids being soluble in water will dissolve in the water and the halosulfates, being generally water insoluble, will separate as the lower organic layer. Use of low temperatures to effect this separation is important both from the standpoint of avoiding excessive heating when the halosulfonic acid dissolves in water, and to avoid hydrolysis of the halosulfate. In some cases, if the halosulfate boils at a sufficiently different temperature from the corresponding halosulfonic acid, it can be removed from the mixture without water washing by a simple distillation, although this procedure is not usually preferred. Iodine which is also usually formed in the reaction can be removed from the halosulfate by filtration, by selective solvent extraction, or other well known techniques.

In many cases, the separation of the crude halosulfate from the excess halosulfonic acid may be accomplished simply by permitting the reaction mixture to stand, whereupon it separates into two phases, an organic phase containing the crude halosulfate, and an inorganic phase containing mostly unreacted halosulfonic acid, after which the halosulfate may be recovered by simple decantation.

The crude halosulfate, after separation from the excess halosulfonic acid as described may be further purified by distillation or other well known techniques.

In the case of the reaction of fluosulfonic acid with an iodide, hydrogen fluoride which is liberated in the processing of the reaction mixture, e.g., during hydrolysis, is sometimes not entirely removed when the reaction mixture is poured over crushed ice or into water held at 0° C. In some cases it may be desirable to follow the water wash with a rapid wash with dilute NaHCO₃ to remove residual hydrogen fluoride, while taking care to avoid hydrolysis of the fluorosulfate.

The following examples illustrate specific embodiments of the invention:

*Example 1.—Thermal reaction of 1-iodoperfluoropropane ($C_3F_7I$) with chlorosulfonic acid*

50 grams (0.429 mole) of chlorosulfonic acid and 11.8 grams (0.0399 mole) of 1-iodoperfluoropropane are sealed under a dry, high purity nitrogen atmosphere in a 70 cubic centimeter heavy wall Pyrex ampule. The tube is shaken and heated at a temperature of 130° C. for 65 hours. The tube contents are a mixture of dark liquid and orange crystals of iodine trichloride ($ICl_3$). After cooling in solid carbon dioxide, the ampule is opened and warmed to room temperature. The volatiles evolved during warming are passed through aqueous neutral potassium permanganate solution to remove sulfur dioxide, dried over anhydrous calcium sulfate, and finally condensed in a refrigerated trap, where there is collected 0.9 gram (0.0044 mole) of n-$C_3F_7Cl$, which is identified by its infra-red spectrum. The conversion to, and yield of n-$C_3F_7Cl$, based on the starting iodide is 11%.

The liquid portion of the reaction products remaining in the tube is distilled in a small Vigreux distillation unit from which there is obtained 10.7 grams of crude n-perfluoropropylchlorosulfate ($C_3F_7OSO_2Cl$) having a boiling point of 66 to 70° C., shown by infrared spectra to contain minor amounts of $SO_2Cl_2$. The yield of, and conversion to, $C_3F_7OSO_2Cl$ based on the starting iodide is 89%.

A fraction of the crude material is washed with water, redistilled to produce a fraction having a boiling point of 80° C. and a refractive index of $n_D^{24}$ 1.3124. This fraction was analyzed with the following results:

Calculated for: $C_3F_7OSO_2Cl$: C, 12.7; F, 46.7; S, 11.3; Cl, 12.5. Found: C, 12.6; F, 46.6; S, 11.4; Cl, 12.5.

The ultra-violet spectrum of this fluorocarbon chlorosulfate $C_3F_7OSO_2Cl$, shows a strong absorption maximum at 203 mμ in the vapor phase and at 218 mμ in isooctane solution; both the vapor and liquid spectra exhibit slight general absorption at 260–290 mμ with a maximum at 275 mμ. These data clearly distinguish the chlorosulfate from the sulfonyl chloride

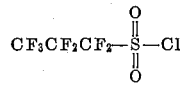

which has absorption maxima at 210, 220, 230 and 240 mμ.

The infrared spectrum of $C_3F_7OSO_2Cl$ produced by the above reaction has an absorption band at 6.82μ (vapor) and 6.89μ (liquid) which is undoubtedly associated with the asymmetrical stretching vibration of the "sulfone" (—$SO_2$—) group. This eliminates the chlorosulfite,

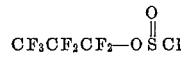

with a "sulfoxide" (—SO—) group which should not have a band at 6.8–6.9μ.

The formation of the chlorosulfate by the above reaction rather than the sulfonyl chloride, the sulfonic acid or the chlorosulfite is further confirmed by the reactions of this and other chlorosulfates mentioned above.

*Example 2.—Reaction of the perfluoro telomer iodide, $C_3F_7[CF_2CF(CF_3)]_4(CF_2CF_2)_{12av}$*I with chlorosulfonic acid*

\* av Denotes "average" indicating a mixture of telomers in which the average number of tetrafluoroethylene ($CF_2CF_2$) units is 12.

The above telomer iodide used as a starting material is prepared as follows. A Monel metal autoclave, of approximately 140 cc. volume, containing 40 grams (0.0446 mole) of $C_3F_7[CF_2CF(CF_3)]_4I$ is sealed, evacuated, and cooled to —195° C. Forty grams (0.40 mole) of tetrafluoroethylene ($CF_2=CF_2$) is admitted to the autoclave by gaseous transfer in vacuo. The reaction mixture is heated while shaking for eighteen hours at a temperature of 190° C. during which the pressure drops from 1400 p.s.i. to below 50 p.s.i. From this reaction there is recovered 1 gram of olefin and 8 grams of

A total of 70 grams (75% conversion) of a white, soft solid $C_3F_7[CF_2CF(CF_3)]_4(CF_2CF_2)_nI$ where the value of $n$ averages 12 per molecule, and containing no substantial amount of material in which the value of $n$ is less than 9 or greater than 25, and having a melting range of 44° to 150° C. (clear melt) is finally collected from the autoclave. Elemental analysis shows the following:

Calculated for: $C_{39}F_{79}I$: C, 22.3; F, 71.6. Found: C, 22.6; F, 70.2.

Twenty-five grams (0.215 mole) of chlorosulfonic acid and 14.5 grams (0.0069 mole) of the telomer iodide prepared as above are sealed under a dry nitrogen atmosphere in a 70 cc. heavy wall Pyrex ampule and heated at 150° C. for 17 hours with shaking. The tube is cooled in solid carbon dioxide (crystals of ICl₃ precipitate) and opened. The acid liquid is decanted and the soft, white solid remaining is dried under nitrogen. 12 grams (84% conversion) of the chlorosulfate, $$C_3F_7[CF_2CF(CF_3)]_4(CF_2CF_2)_{12av}OSO_2Cl$$

is obtained, and a 7.5 gram aliquot is distilled in a small Vigreux distillation unit at about 0.1 mm. Hg pressure to effect the separation of the following fractions:

(a) A fraction boiling between 120–142° C. (principally between 135–140° C.) representing 28% by weight of the aliquot. This is a white opalescent viscous oil having the formula $$C_3F_7[CF_2CF(CF_3)]_4(CF_2CF_2)_{9av}OSO_2Cl$$

having the following analysis:
Calculated for: $C_{33}F_{67}O_3SCl$: C, 22.2; F, 71.3; S, 1.8; Cl, 2.0. Found: C, 22.5; F, 70.6; S, 1.8; Cl, 2.0.

(b) A second fraction boiling between 180–190° C. representing 28% by weight of the aliquot. This is a white grease having the formula $$C_3F_7[CF_2CF(CF_3)]_4(CF_2CF_2)_{11av}OSO_2Cl$$

having the following analysis:
Calculated for: $C_{37}F_{75}O_3SCl$: C, 22.4; F, 71.8; S, 1.6; Cl, 1.8. Found: C, 22.4; F, 72.4; S, 1.6; Cl, 1.8.

(c) A third fraction boiling between 190° C. to 200° C. representing 21% by weight of the aliquot. This is a white wax having the formula $$C_3F_7[CF_2CF(CF_3)]_4(CF_2CF_2)_{13av}OSO_2Cl$$

having the following analysis:
Calculated for: $C_{41}F_{83}O_3SCl$: C, 22.5; F, 72.2; S, 1.5; Cl, 1.6. Found: C, 22.5; F, 71.9; S, 1.4; Cl, 1.6.

(d) A residue consisting of a white friable solid representing 23% by weight of the aliquot, having a melting point of from 245° to 281° C. No decomposition of this solid is noted during the distillation despite a still pot temperature of greater than 400° C. This material, of the following structure:

$$C_3F_7[CF_2CF(CF_3)]_4(CF_2CF_2)_{25av}OSO_2Cl$$

analyzes as follows:
Calculated for: $C_{65}F_{131}O_3SCl$: C, 23.1; F, 73.5; S, 0.95; Cl, 1.05. Found: C, 23.5; F, 73.5; S, 0.90; Cl, 1.07.

The infrared spectra of the above series of compounds $$C_3F_7[CF_2CF(CF_3)]_4(CF_2CF_2)_nOSO_2Cl$$

have a band at 6.85μ (shoulder at 6.94μ) which is assigned to the —OSO₂— group.

$$CF_2ClCF(CF_3)[CF_2CF(CF_3)]_{2av}(CF_2CF_2)_{4av}I$$

*Example 3.—Reaction of with chlorosulfonic acid*

The above telomer iodide is prepared as follows:
To a 300 cc. Monel autoclave containing 78 grams (0.249 mole) of CF₂ClCFICF₃, while evacuated and cooled in liquid nitrogen, there is admitted by gaseous transfer in vacuo 75 grams (0.50 mole) of CF₂=CFCF₃ and 49.5 grams (0.495 mole) of CF₂=CF₂ (the molar ratio of CF₂=CF₂:CF₂=CFCF₃:CF₂ClCFICF₃ equals 2:2:1). The autoclave is sealed and heated at 190° to 220° C. for about five hours while shaking. The pressure drops from 1100 to 900 lbs./in.² gage during this time, most of the drop occurring during the first three hours. There is recovered from the reaction 60 grams of unreacted olefins (mostly perfluoropropene). The remaining liquid products are fractionally distilled in a small Vigreux still. In addition to unreacted CF₂ClCFICF₃ there is collected the following liquid cotelomer fractions:

(a) 14 grams (32 wt. percent) of a liquid having a boiling point of 36° to 52° C. at about 0.1 mm. Hg.

(b) 6.5 grams (15 wt. percent) of a liquid having a boiling point of 52° to 62° C. at about 0.1 mm. Hg.

(c) 7 grams (16 wt. percent) of a liquid having a boiling point of from 62° to 82° C. at about 0.1 mm. Hg.

(d) 3 grams (7 wt. percent) of a liquid having a boiling point of from 82° to 89° C. at about 0.1 mm. Hg.

A residue of 14 grams mainly solids, remains undistilled.

Fraction (c) above having the approximate formula $$CF_2ClCF(CF_3)[CF_2CF(CF_3)]_{2av}(CF_2CF_2)_{4av}I$$

is reacted with an excess of chlorosulfonic acid at a temperature of 150° C. for about 20 hours with shaking. After separation from the excess chlorosulfonic acid, and working up as in Example 1, the chlorosulfate $$CF_2ClCF(CF_3)[CF_2CF(CF_3)]_{2av}(CF_2CF_2)_{4av}OSO_2Cl,$$

is obtained.

*Example 4.—The reaction of $C_2F_5(CF_2CF_2)_3I$ with chlorosulfonic acid*

The iodide $C_2F_5(CF_2CF_2)_3I$ is prepared by the reaction of $C_2F_5I$ with $CF_2=CF_2$ at room temperature in the presence of ultraviolet light, using the procedures described by Haszeldine, Journal of the Chemical Society 3761 (1953).

This iodide is reacted with an excess of chlorosulfonic acid at a temperature of 145° C. in a sealed tube for about 15 hours with shaking. Excess chlorosulfonic acid is removed and the crude product is worked up using procedures similar to those in Example 1 to obtain the chlorosulfate $C_2F_5(CF_2CF_2)_3OSO_2Cl$.

*Example 5.—Reaction of 1,2-dichloro-1,2,2-trifluoroiodoethane with chlorosulfonic acid*

To 93 grams (0.8 mole) of chlorosulfonic acid heated to 50° C. is added during ten minutes while stirring vigorously 23 grams (0.0825 mole) of CF₂ClCFClI. [This latter compound may be prepared by the reaction of iodine chloride (ICl) with CF₂=CFCl at 30° C.] The reaction mixture is heated to 60° C. and stirred for 2 additional hours. After cooling, the reaction mixture is rapidly hydrolyzed by pouring over chipped ice. The lower water insoluble layer is dried with anhydrous calcium sulfate and distilled. There is collected after recovery of unreacted iodide, 12 grams of the chlorosulfate CF₂ClCFClOSO₂Cl. This material was redistilled at 76° C. at 100 mm. Hg. The product has a refractive index of $n_D^{30}$ 1.392, and its infrared spectrum shows the characteristic chlorosulfate band at 6.9μ, (liquid) and 6.84μ (vapor) and has the following analysis:

Calculated for: $C_2F_3Cl_3O_3S$: C, 9.0; S, 12.0. Found: C, 9.4; S, 12.0.

*Example 6.—Reaction of 1,1-dichloro-1,2,2-trifluoro-2-iodoethane with chlorosulfonic acid*

The compound CFCl₂CF₂I and its preparation is described in U.S. Patent 3,002,030 of Murray Hauptschein and Milton Braid.

Thirty grams (0.108 mole) of the iodide 1,1-dichloro-1,2,2-trifluoro-2-iodoethane is added drop by drop during one-half hour to 70 grams (0.601 mole) of chlorosulfonic acid while stirring. During the addition, the reaction temperature is gradually raised until the liberation of iodine and the evolution of SO₂ is observed at 100° C. after the addition of about 8 grams of the iodide. The addition is completed, and the reaction mixture is then stirred for 2 hours longer at 100° C. After cooling, the contents of the flask are poured onto chipped ice and the lower layer is separated, washed once with cold water, dried with a mixture of calcium and magnesium sulfates, and distilled in a small still packed with glass helices. There is collected, after a small fore-run containing less than one gram of unreacted iodide and 1,1,2-trichlorotrifluoroethane, 15 grams of the chlorosulfate $CFCl_2CF_2OSO_2Cl$, the middle cut boiling at 76° C. at about 100 mm. Hg. The compound is a colorless liquid having a refractive index $n_D^{25}$ 1.3943, which is analyzed as follows:

Calculated for: $C_2Cl_3F_3O_3S$: C, 8.98; S, 11.99. Found: C, 9.25; S, 12.24.

The infrared spectrum of this compound has a strong band at 6.89μ (liquid) and 6.82μ (vapor).

*Example 7.—Reaction of 1-iodoperfluoropropane with fluosulfonic acid*

15 grams (0.0507 mole) of $CF_3CF_2CF_2I$ and 30 grams (0.3 mole) of fluosulfonic acid are sealed in vacuo in a 70 cc. heavy-walled Pyrex ampule. The tube is shaken and heated at a temperature of 150° C. for 5 hours. The ampule is cooled in liquid nitrogen and opened. Approximately 0.5 gram of volatile products are collected on warming to room temperature which are found by vapor-liquid partition chromatographic and infrared spectroscopic analyses to contain $SO_2$, $SiF_4$, and $C_3F_8$. In addition, trace amounts of other fluorocarbon materials not fully characterized are present.

The remaining liquid reaction mixture is poured cautiously onto chipped ice. The lower organic layer is separated, washed once with cold 10% aqueous sodium bicarbonate solution, washed again with water, and dried with anhydrous calcium and magnesium sulfate. By vapor-liquid partition chromatographic analysis, in a Perkin Elmer Vapor Fractometer Model 154, the reaction mixture (10.5 grams) is shown to consist almost entirely of equimolar amounts of unreacted n-$C_3F_7I$ (5.5 grams) and n-perfluoropropyl fluorosulfate, $CF_3CF_2CF_2OSO_2F$ (5 grams). The yield of this fluorosulfate, based on reacted iodide is greater than 95% (including $CF_3CF_2COOH$ from hydrolysis of the fluorosulfate during isolation).

An analytical sample of n-$C_3F_7OSO_2F$ is freed from contaminant n-$C_3F_7I$ chromatographically using a Perkin Elmer "B" column at 30° C. under 30 pounds per square inch gage pressure of helium. The elution times for the iodide and the fluorosulfate are 6.2 minutes and one minute respectively. The pure n-perfluoropropyl fluorosulfate is a colorless liquid having a boiling point of 46° C., a refractive index $n_D^{25}$ <1.290. It has a strong band in the infrared spectrum at 6.65μ (vapor) related to the asymmetrical stretching vibration of the "sulfone" (—$SO_2$—) function of the fluorosulfate group which is 0.17μ farther to the visible end of the spectrum than that for the corresponding chlorosulfate. This compound is analyzed as follows:

Calculated for: $C_3F_8O_3S$: C, 13.4; F, 56.7. Found: C, 13.7; F, 56.7.

*Example 8.—Reaction of 1,2-dichloro-1,2,2-trifluoro-1-iodoethane with fluosulfonic acid*

To 45 grams (0.449 mole) of fluosulfonic acid stirred at 70° C. there is added drop by drop during ½ hour 40 grams (0.143 mole) of $CF_2ClCFClI$. Iodine and $SO_2$ are liberated during the addition period and traces of 1,2-dichlorotetrafluoroethane, $CF_2ClCF_2Cl$, are detected in the evolved volatiles spectroscopically. The reaction mixture is stirred for 2 hours at 70° C., and after cooling, is hydrolyzed by pouring cautiously onto chipped ice. The lower organic layer is separated, washed once with cold 10% aqueous sodium bicarbonate solution, and again with cold water.

The mixture of crude reaction products (38 grams) is dried with anhydrous calcium sulfate and magnesium sulfate. By vapor-liquid partition chromatographic analysis this liquid fraction is shown to consist of 8 grams (90% yield based on reacted iodide) of 1,2-dichloro-1,2,2-trifluoroethylfluorosulfate, $$CF_2ClCFClOSO_2F$$

and 30 grams of unreacted iodide.

An analytical sample of $CF_2ClCFClOSO_2F$ is separated chromatographically from the CFClCFClI contaminant using a Perkin Elmer "B" column at 75° C. under 30 pound per square inch gage pressure of helium. The elution times of $CF_2ClCFClOSO_2F$ and $$CF_2ClCFClI$$

were 4.9 and 27 minutes respectively.

Pure $CF_2ClCFClOSO_2F$ is colorless liquid having a boiling point of 89° C., a refractive index $n_D^{24}$ 1.3468. The infrared spectrum of this fluorosulfate has a strong band at 6.71μ (vapor) characteristic of the —$OSO_2F$ group. The compound is analyzed as follows:

Calculated for $C_2Cl_2F_4O_3S$: C, 9.6; Cl, 28.3; F, 30.3; S, 12.8. Found: C, 9.8; Cl, 28.2; F, 30.3; S, 12.6.

*Example 9.—Reaction of 1-chloro-1,2,2,2-tetrafluoro-1-iodoethane with chlorosulfonic acid*

52.5 grams (0.2 mole) of the iodide $CF_3CFClI$, prepared as described in U.S. Patent 3,006,973 is added to 116.5 grams (1 mole) of chlorosulfonic acid heated at 75° C. during a one-half hour period. The reaction mixture is stirred for two hours longer at 75° C. After cooling, the reaction mixture is hydrolyzed by pouring onto crushed ice. The lower layer is rapidly washed with water and dried with anhydrous calcium sulfate. Upon distillation there is collected the chlorosulfate $$CF_3CFClOSO_2Cl$$

having a boiling point of about 90° C.

*Example 10.—Reaction of 1,1-dichloro-2,2,2-trifluoro-1-iodoethane with chlorosulfonic acid*

Twenty-eight grams (1.1 mole) of the iodide $CF_3CCl_2I$, prepared as described in U.S. Patent 3,006,973 is added to 58.2 grams (0.5 mole) of chlorosulfonic acid at room temperature during a period of 20 minutes. The reaction mixture is stirred for 1 day at room temperature, and is then hydrolyzed by pouring onto crushed ice. The lower layer is rapidly washed with water and dried with anhydrous calcium sulfate. Upon distillation there is collected the chlorosulfate $CF_3CCl_2OSO_2Cl$ having a boiling point of about 77° C. at 100 mm. Hg.

*Example 11.—Reaction of*

$$\underset{\underset{CF_3}{|}}{CF_3CF[CF_2CF_2]_4I}$$

*with chlorosulfonic acid*

Into a two liter, three necked flask equipped with a sealed stirrer, thermometer, and reflux column there is charged 696 grams (1.0 mole) of $$\underset{\underset{CF_3}{|}}{CF_3CF[CF_2CF_2]_4I}$$

and 1165 grams (10 moles) of chlorosulfonic acid. The mixture is heated at 130–145° C. while stirring for 6 hours. The reflux condenser is adjusted to permit iodine monochloride, iodine trichloride, $SO_2$ and HCl evolved during the reaction to distill over to suitable collectors while refluxing organic material back into the reaction vessel. The reaction mixture is allowed to cool, is then poured into a separatory funnel and allowed to separate into two layers. The lower organic layer is drawn off and cleanly separated from the upper spent chlorosulfonic acid layer. From this reaction there is obtained a 78.9% yield of the chlorosulfate $$CF_3CF[CF_2CF_2]_4OSO_2Cl$$

a colorless liquid. The infrared spectrum of this chlorosulfate shows the characteristic $SO_2$ peak at $6.87\mu$.

*Example 12.—Reaction of*

$$\underset{\underset{CF_3CF[CF_2CF_2]_4I}{|}}{CF_2Cl}$$

*with chlorosulfonic acid*

Following the procedures of the previous example, the iodide $$\underset{\underset{CF_3CF[CF_2CF_2]_4I}{|}}{CF_2Cl}$$

is reacted with a 10 fold molar excess of chlorosulfonic acid at a temperature of 135–150° C. for 6¾ hours. The chlorosulfate product is separated from the excess chlorosulfonic acid by phase separation to provide an 80.4% yield of the chlorosulfate $$\underset{\underset{CF_3CF[CF_2CF_2]_4OSO_2Cl}{|}}{CF_2Cl}$$

a colorless liquid. The infrared spectrum of this chlorosulfate shows the characteristic $SO_2$ peak at $6.87\mu$.

*Example 13.—Reaction of*

$$\underset{\underset{CF_2ClCF[CF_2CF_2]_3I}{|}}{CF_3}$$

*with fluosulfonic acid*

Into a 300 milliliter stainless steel autoclave there is charged 91.8 grams (0.15 mole) of $$\underset{\underset{CF_2ClCF[CF_2CF_2]_3I}{|}}{CF_3}$$

and 150 grams (1.5 mole) of fluosulfonic acid. The starting iodide is prepared by the reaction of $$\underset{\underset{CF_2ClCFI}{|}}{CF_3}$$

with tetrafluoroethylene according to the procedure described in co-pending application Serial No. 82,701, filed January 16, 1961 of Murray Hauptschein and Milton Braid. The autoclave and contents are heated at 195° C. for 16½ hours while shaking. After cooling, the autoclave is opened, the contents poured out, and permitted to settle into two layers. The organic product is separated from the spent fluosulfonic acid in a separatory funnel, giving 78 grams (83% yield) of the fluorosulfate $$\underset{\underset{CF_2ClCF[CF_2CF_2]_3OSO_2F}{|}}{CF_3}$$

a colorless liquid having a boiling point of 94–95° C. at 20 mm. Hg. The infrared spectrum of this fluorosulfate shows the characteristic $SO_2$ peak at $6.69\mu$.

*Example 14.—Reaction of*

$$\underset{\underset{CF_2ClCF[CF_2CF_2]_3I}{|}}{CF_3}$$

*with chlorosulfonic acid*

Into a 2 liter, three necked flask equipped with a sealed stirrer, thermometer and reflux column there is charged 596 grams (1.0 mole) of $$\underset{\underset{CF_2ClCF[CF_2CF_2]_3I}{|}}{CF_3}$$

and 2330 grams (20 moles) of chlorosulfonic acid. The mixture is heated at 125–145° C. while stirring for 4 hours. The reflux condenser is adjusted to permit iodine monochloride, iodine trichloride, $SO_2$ and HCl evolved during the reaction to distill over to suitable collectors while refluxing organic material back into the reaction vessel. The reaction mixture is allowed to cool, is then poured into a separatory funnel and allowed to separate into layers. The lower organic layer is drawn off and cleanly separated from the upper spent chlorosulfonic acid layer. From this reaction there is obtained a 78% yield of the chlorosulfate $$\underset{\underset{CF_2ClCF[CF_2CF_2]_3OSO_2Cl}{|}}{CF_3}$$

a colorless liquid having a boiling point of 120° C. at 23 mm. Hg. The infrared spectrum of this chlorosulfate shows the characteristic $SO_2$ peak at $6.87\mu$.

As pointed out previously, the new perhalogented chlorosulfates and fluorosulfates of the invention have excellent utility as intermediates for the formation of a wide variety of derivatives by simple one step reactions, such as perhalogenated carboxylic acids and carboxylic acid salts, perhalogenated esters, perhalogenated amides and substituted amides and perhalogenated thiol esters.

In addition to their utility as intermediates for many valuable perhalogenated compounds, the halosulfates of the invention are useful in themselves. The lower members, particularly those having from 1 to 3 carbon atoms, and especially the fluorosulfates, are useful as insecticides, bactericides, fungicides and the like. The longer chain members, particularly those having about 6 to 15 carbon atoms in the chain and especially the perfluorinated halosulfates are useful in themselves as surfactants, wetting agents, emulsifiers and the like, or as additives to chromium plating baths for reduction of the mist and spray normally encountered in such baths. The halosulfates of the invention may also be employed, for example as acylating agents for cotton and regenerated cellulose fibers and fabrics without the necessity of first hydrolyzing the halosulfate to the acid. Such treatment imparts flame and water resistance to the fabric, and in the case of relatively long chain highly fluorinated halosulfates likewise imparts resistance to oil and grease spotting.

We claim:

1. A perhaloalkyl halosulfate of the formula $$RCX_2OSO_2X$$

where R is selected from the class consisting of fluorine, perfluoroalkyl and perfluorochloroalkyl containing up to 65 carbon atoms and where X is selected from the class consisting of fluorine and chlorine.

2. A perhaloalkyl halosulfate of the formula $$RCX_2OSO_2X$$

where R is perfluoroalkyl containing up to 65 carbon atoms and where X is selected from the class consisting of chlorine and fluorine.

3. A perhaloalkyl halosulfate of the formula $$RCX_2OSO_2X$$

where R is monochloroperfluoroalkyl containing up to 65 carbon atoms and where X is selected from the class consisting of chlorine and fluorine.

4. A perhaloalkyl halosulfate of the formula $$RCX_2OSO_2X$$

where R is perfluoroalkyl having from 5 to 15 carbon atoms and where X is selected from the class consisting of fluorine and chlorine.

5. A perhaloalkyl halosulfate of the formula $$RCX_2OSO_2X$$

where R is perfluorochloroalkyl having from 5 to 15 carbon atoms and where X is selected from the class consisting of fluorine and chlorine.

6. A perhaloalkyl halosulfate of the formula $$RCF_2OSO_2X$$

where R is perfluoroalkyl having from 5 to 15 carbon atoms and where X is selected from the class consisting of chlorine and fluorine.

7. A perhaloalkyl halosulfate of the formula $$RCF_2OSO_2X$$

where R is monochloroperfluoroalkyl having from 5 to 15 carbon atoms and where X is selected from the class consisting of chlorine and fluorine.

References Cited by the Examiner

UNITED STATES PATENTS 2,628,972   2/1953   Calfee et al. _____ 260—456
2,878,156   5/1959   Davis _____ 260—456 X CHARLES B. PARKER, *Primary Examiner.*